United States Patent [19]

Hurt

[11] E Re. 31,338

[45] Reissued Aug. 9, 1983

[54] PUMP ASSEMBLY DRIVEN BY ENDLESS CONVEYOR

[75] Inventor: Frank K. Hurt, North Tazewell, Va.

[73] Assignee: MEFCOR, Bluefield, Va.

[21] Appl. No.: 255,137

[22] Filed: Apr. 17, 1981

Related U.S. Patent Documents

Reissue of:

[64] Patent No.: 4,213,743
Issued: Jul. 22, 1980
Appl. No.: 898,062
Filed: Apr. 20, 1978

[51] Int. Cl.[3] ..... F04B 9/02; F04B 17/00; F16H 13/10; B65G 21/00

[52] U.S. Cl. ..... 417/229; 417/362; 415/123; 74/203; 198/502

[58] Field of Search ..... 417/229, 321, 362; 74/203; 415/122 R, 123; 198/502

[56] References Cited

U.S. PATENT DOCUMENTS

| | | | |
|---|---|---|---|
| 280,247 | 6/1883 | See | 60/325 |
| 433,549 | 8/1890 | Soule | 198/502 |
| 1,973,312 | 9/1934 | Hardinge | 198/505 |
| 2,510,163 | 6/1950 | Wood | 198/502 |
| 2,589,220 | 3/1952 | Buckeridge | 198/502 |
| 2,951,576 | 7/1957 | Buckeridge | 198/573 |
| 4,041,785 | 8/1977 | Roark | 74/11 |
| 4,133,581 | 1/1979 | Satterwhite | 299/7 |
| 4,218,881 | 8/1980 | Huffman et al. | 60/325 |

OTHER PUBLICATIONS

*Centrifugal Switches For Belt Conveyors*, Hubbell Ensign Electric Division, Harvey Hubbell, Inc., Huntington, West Virginia, 25704, Dated Apr. 25, 1968.

*Primary Examiner*—John J. Vrablik

*Attorney, Agent, or Firm*—Griffin, Branigan & Butler

[57] ABSTRACT

A pump assembly to be used for mining, and the like, is supported on rope-like members (32, 110, 112, 140, 181, 190) of an endless conveyer. In one type of embodiments a channel-shaped mounting member (20, 72, 138, 164, 192) of the pump assembly straddles the rope-like support members and allows the weight distribution of the pump assembly to cause a drive wheel (16, 68, 142, 146, 196) of the pump assembly to come into contact with the endless conveyer (28, 144, 198) to thereby drive a pump (18, 76, 134, 160, 182) of the pump assembly. In a particular one of these types of embodiments the pump (134) is mounted inside the rope-like support member (140) to urge the drive wheel (142) downwardly against the return portion (144) of the endless conveyer and in other particular ones of these types of embodiments the pump (18, 76, 160) is located outside the rope-like support member (32, 181 [164]) so that the drive wheel (16, 68, 146) is urged upwardly against the conveying portion (28) of the endless conveyer. In one embellishment a centrifugal pump (76) is used in combination with a speed increasing linkage system (78) to drive the centrifugal pump (76) sufficiently fast to provide adequate pumping. In another embellishment, which can be used with the above mentioned embodiments or in a separate embodiment, the pump assembly is positioned so that its drive wheel (16, 126) only contacts the endless conveyer (28) when the endless conveyer is loaded. This embellishment does not necessarily require pivoting about a single rope-like support member, rather, such a pump assembly can be mounted on rope-like support members (110, 112) on opposite sides of the conveyer. Another type of embodiments employs a pump (182) mounted on the ground being driven by a flexible linkage (186) extending from a seesaw type energy take-off system.

9 Claims, 8 Drawing Figures

PUMP ASSEMBLY DRIVEN BY ENDLESS CONVEYOR

Matter enclosed in heavy brackets [ ] appears in the original patent but forms no part of this reissue specification; matter printed in italics indicates the additions made by reissue.

BACKGROUND OF THE INVENTION

The information in application Ser. No. 771,855, filed on Feb. 23, 1977, now U.S. Pat. No. 4,088,222 is hereby incorporated herein by reference.

This invention relates broadly to the art of liquid pumps to be used in mines or the like.

Coal mines, and other types of mines often have the problem of water accumulation therein and it is, therefore, necessary to exhaust such water from the mines. It is rather common practice to place electrical or gasoline powered pumps in the vicinity of liquid puddles in mines to pump the liquids from mines through hoses extending outside the mines. A difficulty with such pump systems is that the electrical energy must be extended thereto or they must be periodically fueled. In addition to the extra effort and expense associated with providing energy to these systems, they are somewhat unsafe in that both gasoline and electric motors can cause combustion of coal dust, etc. Fire suppression equipment and/or explosion-proof electric motors are sometimes required to reduce this hazard, however, such equipment is unduly expensive. Thus, it is an object of this invention to provide a pump assembly for use in mines, and the like, which utilizes safe energy already available at most locations within mines so that the pump assembly does not require the stringing of additional electrical wires thereto, the periodic refueling thereof, or the utilization of expensive equipment, but which, is safer than most prior-art systems.

Still another difficulty with the prior art systems described above is that their long hoses are costly and are sometimes cumbersome in the mines. Thus, it is another object of this invention to provide a pump system which does not necessarily require the use of long hoses extending through mines but yet evacuates liquids from the mines.

Yet another difficulty with many prior-art pumping systems is that electrical, gasoline, or other types of independent motive systems used therefor are expensive to buy and unduly subject to malfunctions during operation thereof. Therefore, it is another object of this invention to provide a pump system which does not require an independent motive source to drive it.

It is a further object of this invention to provide a pumping system for use in mines and the like which is uncomplicated in structure, easy to mount, and relatively inexpensive.

SUMMARY

According to an aspect of this invention, a pumping assembly for use in mines includes a channel-shaped mounting member for mounting the system on conveyer-supporting wire ropes. The channel-shaped mounting member allows the pumping assembly to be pivoted by weight distribution such that a drive wheel of the pumping system is urged against the conveyer belt to drive a pump of the pumping assembly. In one embodiment the pump of the pumping assembly is positioned inside the channel-shaped mounting member so as to drive the wheel against a return portion of the conveyer belt and in another embodiment the pump is located outside the channel-shaped mounting member to urge the drive wheel against the conveying portion of the conveyer belt. In one embodiment an impeller of a roller pump is driven directly by the drive wheel but in another embodiment a centrifugal pump is used and its impeller is driven by a speed-increasing linkage attached to the drive wheel. In another embodiment, the pumping system is positioned such that its drive wheel only comes into contact with the conveyer belt if the conveyer belt is loaded. Thus, the pump only pumps when the conveyer belt is loaded. With this system the pump exhausts liquids onto a loaded conveyer belt but not onto an empty one. In this system it is not necessary for the pump system to pivot about the rope-like support member but rather it is mounted on rope-like support members positioned on opposite sides of the conveyer.

In a modified form of this invention a pump is mounted on the ground and is driven by a flexible linkage extending from a seesaw type energy take-off system.

BRIEF DESCRIPTION OF THE DRAWINGS

The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF PREFERRED EMBODIMENT

Figure 1:
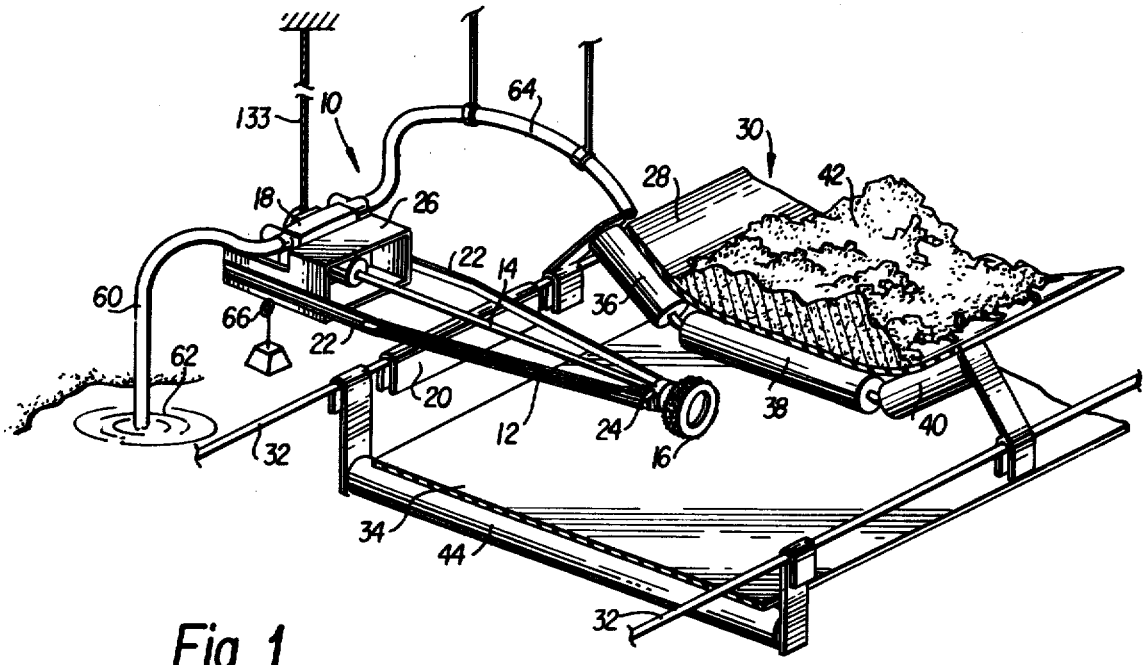
FIG. 1 is an isometric cutaway view of a conveyer belt system in which a pump assembly employing principles of this invention is used.

A pumping assembly 10 basically comprises an elongated frame 12, a drive shaft 14, a drive wheel 16, a pump 18, and a channel-shaped mounting member 20.

The elongated frame 12 is generally an A-frame formed by struts 22 merging at a bearing mount 24 at one end and being attached to a U-shaped pump-holding tray 26 at the opposite end. In the illustrated embodiment the struts 22 have L-shaped cross-sections and are made of steel, however, other arrangements could probably be used equally as well.

The drive shaft 14 rides in a bearing (not shown) held by the bearing mount 24. The drive wheel 16 is attached to, and rotatable with, the outer end of the drive shaft 14. In the illustrated embodiment, the drive wheel is constructed of nylon bristles (brush like) so as to provide good friction between the drive wheel and the underside of a conveying portion 28 of a conveyer belt 30. However, it is also possible to make the drive wheel in other ways such as with steel bristles or solid rubber. It is thought that bristles obtain the best traction on wet, oily, slimy, or otherwise muddy belts.

With regard to the conveyer belt, the illustrated conveyer belt 30 is of a type used in many coal, and other types, of mining operations. The conveyer belt 30 is mounted on wire ropes, or cables 32 such as are depicted in the drawings. In such cases there is a conveying portion 28 of the belt and a return portion 34. The conveying portion 28 is carried on trough guide rollers 36, 38 and 40 which are arranged to shape the conveying portion 28 of the belt into a trough for holding coal 42 or other conveyed material. The return portion 34 of the belt 30 rides on straight guide rollers 44.

Both the trough guide rollers 36, 38 and 40 and the straight guide rollers 44 are supported by the wire rope 32.

Figure 2:
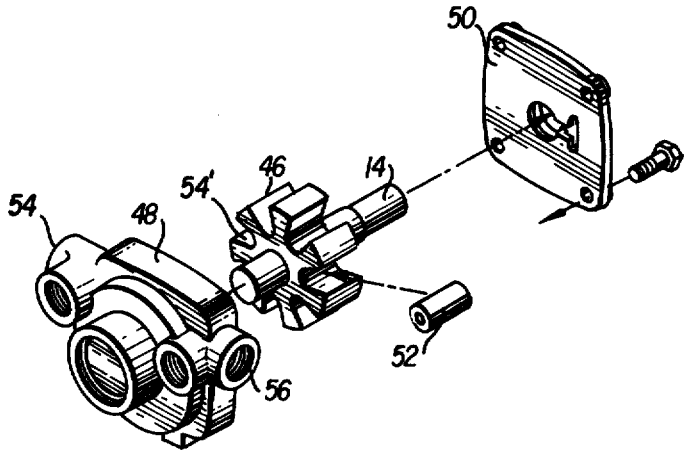
FIG. 2 is a simplified exploded view of the pump of the pump assembly of FIG. 1.

The pump 18 is mounted on the pump-holding tray 26 (although it would also be possible to attach the struts 22 directly to the pump 18 and eliminate the pump-holding tray 26) and this pump is shown in more detail in FIG. 2. Basically, the drive shaft 14 is attached to an impeller 46 of the pump to drive the impeller 46 at the same speed at which the drive wheel 16 rotates. In this respect, the bristle-type drive wheel 16 is between 4 and 6 inches in diameter (the diameter varies in order to obtain the proper combination of speed and torque necessary for most efficient and desirable pump operation) but is preferably around 5 inches in diameter. A conveyer belt normally travels at around 500 feet per minute. Thus, the impeller 46 is driven around 400 RPM's. Such a rotational speed is adequate for the roller or vane, type of pump depicted in FIGS. 1 & 2. In this respect, this roller pump mainly comprises a pump body 48, an end plate 50, the impeller 46 and rollers 52 (only one shown). In operation, when the shaft 14 rotates the rollers 52, which ride in slots 54 in the impeller 46, move in and out of the slots to follow an eccentric shape of a cavity in the pump body 48. This in-and-out motion creates a negative pressure at the inlet 56 and a positive pressure at the outlet 54. Such a pump is designed to operate at the speed of the shaft 14 (400–500 rpm with the drive wheel 16 having a diameter of between four and six inches). Such a pump is sold under the trademark TEEL, model 1P736 by Dayton Electric Manufacturing Co., Chicago, Illinois, 60648.

In the FIG. 1 embodiment the inlet 56 of the pump is attached to a hose 60 which is extended into a puddle of water 62. The outlet 54 of the pump 18 communicates with a hose 64 which extends above the conveying portion 28 of the conveyer 30. Thus, liquids that are pumped by the pump 18 from the puddle 62 are deposited onto the conveying portion 28 of the conveyer 30 and conveyed out of a mine. However, it should be understood that the pumping assembly 10 can be used equally well conveying liquids through pipes or hoses to other sections of a mine to be removed by other means, such as a larger motor or engine-driven pump.

The channel-shaped mounting member 20 is welded to the bottom side of the struts 22 intermediate the pump 18 and the drive wheel 16 at a location to serve as a fulcrum. In this respect, the channel-shaped mounting member 20 basically forms a U-shaped channel which opens downwardly and which is designed to fit onto the conveyer-supporting wire ropes 32 as is depicted in FIG. 1. When the pump assembly is thusly mounted on a wire rope 32, the elongated frame 12, with the drive wheel 16, and the pump 18, are free to pivot about the wire rope 32, according to weight distribution to engage the drive wheel 16 with the conveying portion 28.

An embellishment of this device includes eyebolts 66 to which weights can be tied for providing additional pivoting action to increase the bias of the roller 16 against the conveying portion 28 of the conveyer belt.

In operation, when it is desired to use the pump assembly 10 of this invention to pump water, it is mounted by inserting the drive-wheel end 16 of the elongated frame 12 between the conveying portion 28 of the conveyer belt 30 and the conveyer-supporting wire rope 32. The elongated frame 12 is manipulated to place the channel-shaped mounting member 20 over the wire rope 32 and the pump assembly is then released to pivot on the wire rope 32. The weight at the pump end 18 of the elongated frame 12 overcomes the weight at the other end to move the drive wheel 16 upwardly against the bottom, or clean side, of the conveying portion 28 of the conveyer belt 30. In this respect, it should be noted that the drive wheel 16 strikes the bottom of the conveying portion 28 at a lower floor, or apex of the returned portion. The floor is relatively broad and it is not necessary that the drive wheel 16 strike the exact apex point. This feature allows the pump assembly of this invention to be used with belts of various widths. For example, most underground coal mine belts are either 36 or 42 inches wide; however, some are 30-inches and some are 48-inches wide. By fabricating the drive wheel 16 approximately 21 inches from the channel-shaped mounting member 20 the pump assembly can be made to fit all of these belt sizes.

Once the pump assembly of this invention is seesaw mounted on the wire rope 32, the impeller 46 of the pump 18 is linked with the conveyer belt. Thus, as the conveyer belt moves it rotates the drive wheel 16, which rotates the drive shaft 14, and the impeller 46. The impeller 46, with the rollers 52, pump water from the puddle 62 onto the conveying portion 28 of the conveyer 30, or through pipes or hoses to another area.

A limitation of the pumping assembly of FIGS. 1 and 2 is that the roller pump 18 sometimes clogs from dirt, grime, etc. passing through it.

Figure 3:
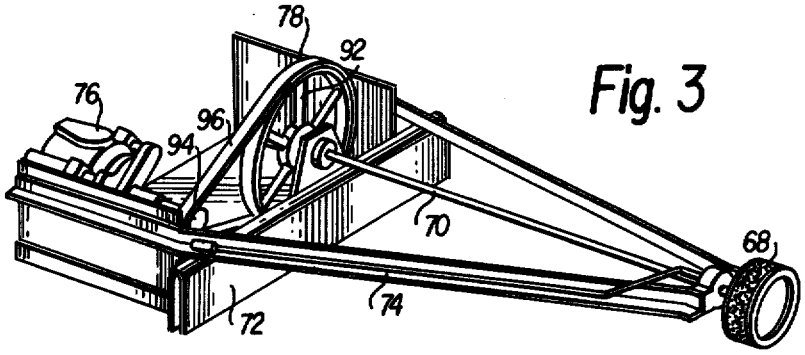
FIG. 3 is an isometric view of a second embodiment pump assembly.

FIG. 3 depicts a more clog resistant embodiment of this invention having similarities with the embodiment already described in that it includes a drive wheel 68, a drive shaft 70, a channel-shaped mounting member 72, an elongated frame 74, and a pump 76. However, this pump assembly differs from the pump assembly of FIGS. 1 & 2 in that it employs a centrifugal type pump 76 and a linkage 78 thereto to increase the rotational speed of the pump 76. In this respect, with reference to FIG. 4, a centrifugal pump, to be effective, must rotate at a significantly higher speed than the drive wheel 68. Liquid enters an inlet 80 in a housing 82 and impinges on an impeller 84 at its center 86. The impeller 84 has spiraled vanes 88 which drive the liquid outwardly toward an outlet 90 when the impeller 84 is rotated. Thus, a negative pressure is created at the inlet 80 and a positive pressure at the outlet 90.

The linkage 78 between the drive shaft 70 and the impeller 84 of the pump 76 includes a large pulley 92 attached to the drive shaft 70, a small pulley 94 attached to an impeller shaft 70A, and a belt 96 extending therebetween. The relatively small (1¼ inch) centrifugal pump 76 uses this type of drive to increase its speed to approximately 2,400 RPM which is about 5 times greater than the drive wheel speed of 400 to 500 RPM's of the FIG. 1 embodiment. Such a centrifugal pump is sold by Dayton Electric Manufacturing Co., Chicago, Illinois 60648, under the trademark TEEL, model 1P884.

This centrifugal pump can handle solids up to ⅜ inch diameters which is highly desirable for pumping in a mine-type environment.

Figure 4:
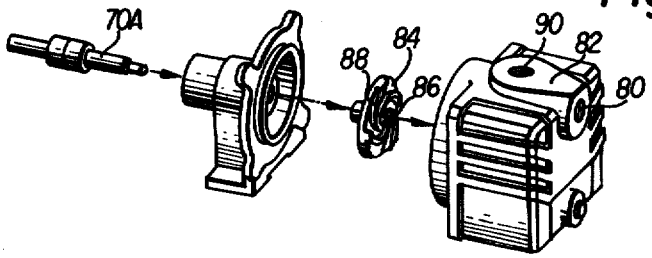
FIG. 4 is an exploded view of the pump of the FIG. 3 pump system.

Operation of the FIGS. 3 and 4 embodiment is similar to operation of the FIGS. 1 and 2 embodiment in that the assembly is mounted on a wire rope 32 in a seesaw manner so that the drive wheel 68 is urged upwardly against a conveying portion 28 of an endless conveyer. Movement of the conveying portion 28 of the conveyer drives the drive wheel 68 which, in turn, drives the pump impeller 84 via the drive shaft 70, the large pulley 92, the belt 96, and the small pulley 94 at a sufficiently fast speed to pump liquids from puddles onto the conveying portion 28 of an endless conveyor, through long hoses out of mines or to some other means of disposal, such as a larger pump.

Figure 5:
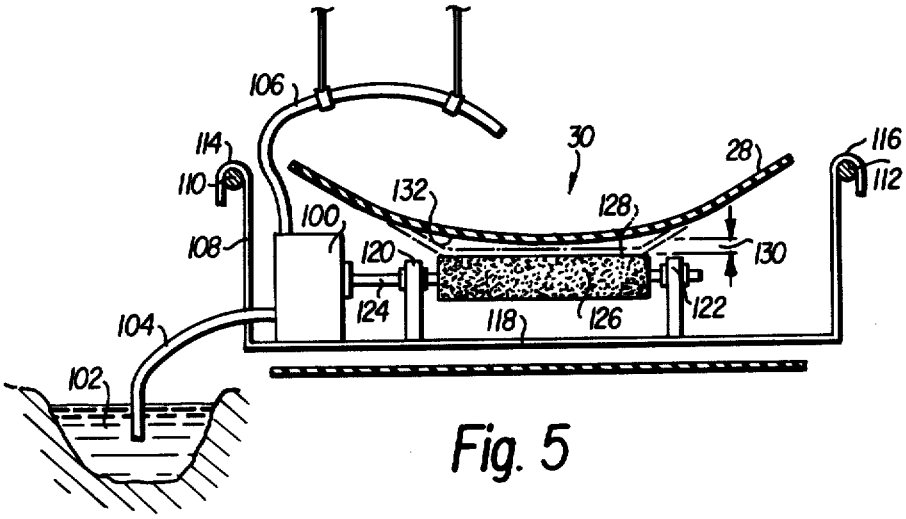
FIG. 5 is a sectional view of a belt system in which a pump assembly mounted in accordance with yet another embodiment is employed.

FIG. 5 depicts another embodiment of this invention wherein a pump 100 pumps liquid from a puddle 102 onto a conveying portion 28 of a conveyer 30 via an inlet hose 104 and an exhaust hose 106. However, the pump 100 is mounted quite a bit differently than in the previously described embodiments. In this respect, the pump 100 is mounted on a frame 108 which is supported on oppositely positioned conveyer-supporting wire ropes 110 and 112 by means of hooks 114 and 116 respectively. Thus, the pump assembly of FIG. 5 does not pivot in seesaw fashion as in the previously described embodiments. A horizontal portion 118 of the frame 108 supports bearings 120 and 122 and the pump 100. A drive shaft 124 rotatively rides in the bearings 120 and 122 and is linked to an impeller (not shown) of the pump 100. In this respect, the pump 100 can be of various types, and a pump which would function properly in this embodiment is the pump of FIG. 4, with a speed increasing linkage. An enlarged bristle drum 126 is fixedly mounted on the drive shaft 124 to rotate therewith. It should be noted that an upper outer surface 128 of the enlarged bristle drum 126 is spaced a distance 130 from the lower surface 132 of an empty conveying portion 28; however it is in contact with the lower surface 132 of the conveying portion 28 when the conveying portion 28 is loaded. In this manner, the pump 100 is only driven when the conveying portion 28 is loaded. Thus, liquid is not pumped onto an empty conveyer belt in which it can flow downstream to accumulate at a low point on the belt, but rather is pumped only onto coal, or the like, which absorbs the liquid and therefore carries it out of the mine.

The protective spacing arrangement of FIG. 5 is also accomplished with the arrangements of FIGS. 1 and 3 by anchoring the pumps from above by a tether 133 (FIG. 1) to not permit counterclockwise rotation of the pump assemblies beyond a certain [rotation] *rotated* position.

Figure 6:
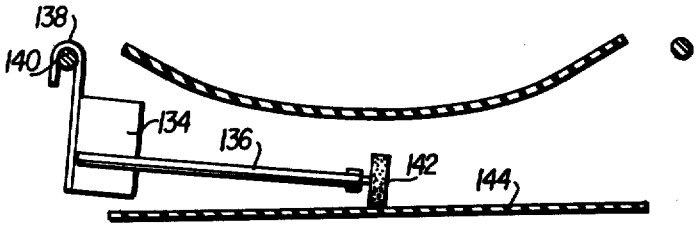
FIG. 6 is a sectional view of a conveyer-belt system having mounted thereon a pump assembly in accordance with yet another embodiment.

FIG. 6 depicts yet another arrangement of this invention wherein a pump 134 is arranged on an elongated frame 136 inside a channel-shaped mounting member 138. Thus, when the pump assembly of FIG. 6 is mounted on a wire rope 140, it pivots thereabout such that its drive wheel 142 is urged downwardly against a return portion 144 of an endless conveyer. That is, the pump assembly of FIG. 6 is rotated about the wire rope 140 in a clockwise direction as was not the case in the FIGS. 1 and 3 embodiments. In this embodiment, the pump 134 can be of various types and it is not thought necessary to go into further detail. In addition, this pivoting arrangement is used with other types of energy utilization devices such as belt switches and the like.

Figure 7:
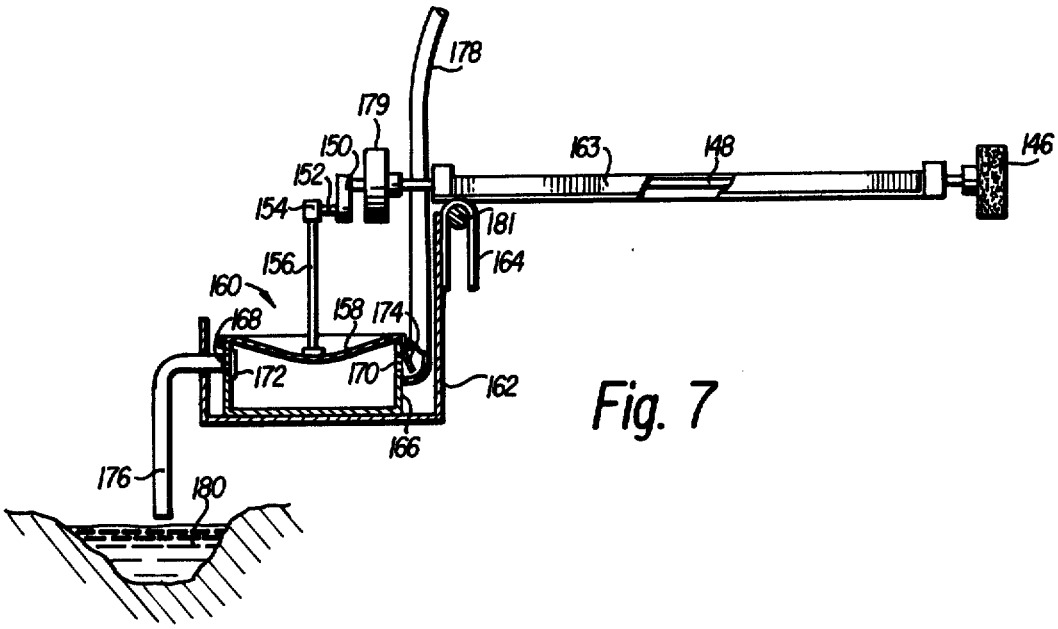
FIG. 7 is a sectional schematic view of a pump assembly similar to the assemblies of FIGS. 1 and 3, but with a diaphragm-type pump; and, FIG. 8 is a sectional schematic view of a modified embodiment pump assembled in accordance with this invention.

FIG. 7 depicts an alternate embodiment of this invention which is similar to the embodiments of FIGS. 1 and 3 but which employs a diaphragm pump rather than the roller pump of FIG. 1 or the centrifugal pump of FIG. 3. In this respect, a drive wheel 146 is attached to a shaft 148 which is in turn attached to a crank 150. A pin 152 of the crank 150 rides in a bearing 154 whose outside race is attached to a shaft 156. The other end of the shaft 156 is attached to a diaphragm 158 which is part of a pump 160. The pump 160 is mounted on a pump tray 162 which is, in turn, mounted to appropriate struts 163 and a channel-shaped mounting member 164 in the same manner as are the corresponding elements of the pump assemblies of FIGS. 1 and 3. In any event, the pump 160 includes a pump housing 166 defining inlet and outlet openings 168 and 170. The inlet and outlet openings have appropriate one-way valves 172 and 174 mounted thereat for controlling the flow of fluid into and out of the pump housing 166. In the depicted embodiment, these valves are represented as being flap valves, however, in many diaphragm pumps they are ball valves etc. Inlet and outlet hoses 176 and 178 are attached to the pump housing 166 at the inlet and outlet openings 168 and 170. A flywheel 179 is mounted on the shaft 148 for maintaining steady rotation of the shaft when the drive wheel 146 loses contact with the endless belt, for example.

In operation, the pump assembly of FIG. 7 is mounted on a rope-like conveyor support 181 in the manner of the other pump assemblies described above. When the drive wheel 146 is rotated by an endless conveyor belt it rotates the shaft 148, the crank 150, and the crank pin 152. The crank pin 152 carries the bearing 154 and its attached shaft 156 up and down in an oscillating manner. The shaft 156, therefore, moves the attached diaphragm 158 up and down, in a reciprocating manner. The up and down motion of the diaphragm 158 increases and decreases the volume of the interior of the pump housing 166 therefore creating negative and positive pressure therein. These negative and positive pressures automatically actuate the one-way valves 172 and 174 to cause pumping from a liquid pool 180 through the inlet tube 176, the pump housing 166, and finally the outlet tube 178 onto the loaded conveyor belt, through hoses or tubes out of the mine, or simply to other areas for further conveying by larger pumps.

A diaphragm pump 160 which could be used in this device is sold by Barnes Manufacturing Company of Oakland, California as part of an electric motor driven lightweight cast iron diaphragm pump assembly models 20 CDE and 20 CDE-1, however, other diaphragm pumps would also work in this environment.

The diaphragm pump of FIG. 7 has benefits over the roller and centrifugal pumps of FIGS. 1 and 3 in that it can run dry for longer periods of time without damage. In this respect, often water puddles in mines are relatively small and the small amounts of water are pumped dry fairly quickly. This means that pumps, which are often left unattended, must run dry until enough water trickles back into the puddle to allow the pump to reprime itself. Therefore, the ability of a diaphragm pumping assembly to run dry without damage and then to reprime itself is desirable. Although the centrifugal pump of FIG. 3 also works well in this environment, it is rather expensive and it does require costly speed increasing linkage. Another advantage of diaphragm pumps is that they can be operated at relatively low speeds and can be driven directly from the shaft 148. In addition, diaphragm pumps handle solids relatively well.

Figure 8:
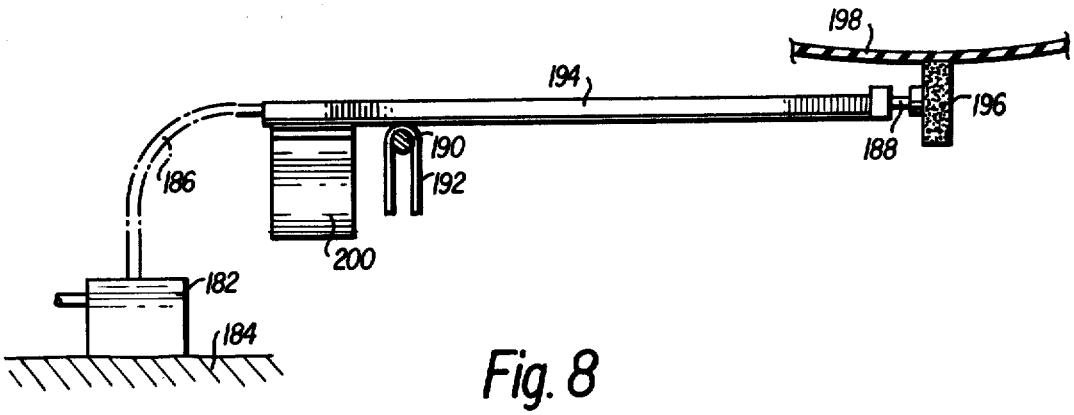

FIG. 8 shows yet another embodiment of this invention in which a pump 182 is positioned on the ground 184. The pump 182 is driven via a flexible shaft 186 which is, in turn, driven by a rotatable shaft 188. The rotatable shaft 188 is mounted on a rope-like conveyer support 190 by a U-shaped channel member 192 and frame 194 in the same manner as the pump assemblies of FIGS. 1, 3 and 7. A drive wheel 196 is urged against a conveyer belt 198 by seesaw action produced by a weight 200, which is attached to the frame 194. Thus, the only real difference between this embodiment and the embodiments of FIGS. 1 and 3 is that in this embodiment the pump 182 is not mounted on the frame 194, but rather, is mounted on the ground 184 while a weight 200 weights the frame 194 to cause the required seesaw action to maintain the drive wheel 196 in contact with the conveyer belt 198.

While this invention has been particularly shown and described with reference to preferred embodiments, it will be understood by those skilled in the art [the] *that* various changes in form and detail may be made therein without departing from the spirit and scope of the invention. That is, while present preferred embodiments of the invention have been illustrated and described herein, it may be otherwise embodied and practiced within the scope with the following claims:

I claim:

1. A liquid evacuation system comprising:

an endless conveyer for conveying bulk material;

a pump mounted adjacent to said endless conveyer and including a drive wheel for engaging said endless conveyer to drive said pump and including an inlet hose for extending into liquid to be evacuated and an outlet hose for depositing said liquid onto said endless conveyer;

said drive wheel being positioned below a conveying portion of said endless conveyer and being spaced therefrom when said endless conveyer is empty, but said conveying portion sinking to come into contact with said drive wheel when said endless conveyer is loaded.

2. A liquid evacuation system as in claim 1 wherein said endless conveyer is mounted on rope-like supports.

3. A liquid evacuation system as claimed in claim 2 wherein is further included a means for mounting said pump on said rope-like supports.

4. A liquid evacuation system as in claim 3 wherein said means for mounting said pump includes an elongated frame having hooks at opposite ends thereof for suspending said frame from rope-like supports positioned on opposite sides of said endless conveyer, said pump being mounted on said elongated frame between said hooks.

5. A liquid pump assembly to be mounted on a rope-like member of an endless conveyor support, said rope-like member being positioned adjacent to and extending parallel with, an endless conveyer having conveying and return portions for engaging said endless conveyer to be thereby powered, said liquid pump assembly comprising:

an elongated frame;

a shaft journaled for rotation in said frame and extending longitudinally along said frame;

a drive wheel attached to and rotatable with said shaft;

a liquid pump mounted on said frame at a position spaced from said drive wheel, said pump defining a liquid inlet and outlet, said pump having an impeller means movably linked to said shaft for moving in response to rotation of said shaft for creating a pressure differential between said inlet and outlet; and a mounting means attached to said elongated frame for mounting said elongated frame on said rope-like member running parallel to said endless conveyer for bringing said drive wheel into contact with said endless conveyer to be thereby driven by said endless conveyer;

wherein said pump assembly is positioned such that its drive wheel is spaced from the endless conveyer when the endless conveyer is not loaded, but is in contact with the endless conveyer when the endless conveyer is loaded.

6. An energy take-off assembly to be mounted on rope-like members of an endless conveyer support, said rope-like members being positioned on opposite sides of, and extending parallel with, an endless conveyer having conveying and return portions for engaging said endless conveyer to be thereby powered, said energy take-off assembly comprising:

an elongated frame;

a shaft journaled for rotation in said frame and extending longitudinally along said frame;

a drive wheel attached to and rotatable with said shaft;

an energy take-off means mounted on said frame at a position spaced from said drive wheel, said energy take-off means being linked to said shaft and including an impeller rotatable with said shaft; and, mounting hooks attached to opposite ends of said elongated frame for hanging said elongated frame on said rope-like members on opposite sides of said endless conveyer for holding said drive wheel in contact with said endless conveyer to be thereby driven by said endless conveyer.

7. An energy take-off means as in claim 6 wherein said drive wheel is positioned below a conveying portion of said endless conveyer and being spaced therefrom when said endless conveyer is empty, but said conveying portion sinking to come into contact with said drive wheel when said endless conveyer is loaded.

8. An energy take-off system as in claim 6 wherein said energy takeoff means is a pump having an inlet and an outlet and wherein said impeller creates negative pressure at said inlet and positive pressure at said outlet for pumping fluid.

*9. In a belt conveyor drive system for underground mines, the combination with a conveyor including an endless belt having vertically spaced advance and return flights, whereof the advance flight rides on a pulley assembly supported at sides on side members extending substantially the length of the conveyor, of a pump assembly comprising a drive roller drivable off the advance flight, a pump drivably connected to said drive roller, a base mounting said drive roller and pump, and connector means connected to said base for releasably mounting said pump assembly in any selected operative position longitudinally of the conveyor.*

* * * * *